United States Patent
Mudulodu et al.

(10) Patent No.: US 7,859,990 B2
(45) Date of Patent: Dec. 28, 2010

(54) METHODS AND SYSTEMS FOR PERFORMING CHANNELS ESTIMATION IN A WIRELESS COMMUNICATION SYSTEM

(75) Inventors: Sriram Mudulodu, Santa Clara, CA (US); Sam P. Alex, Santa Clara, CA (US); Louay Jalloul, Santa Clara, CA (US)

(73) Assignee: BECEEM Communications Inc., Santa Clara, CA (US)

( * ) Notice: Subject to any disclaimer, the term of this patent is extended or adjusted under 35 U.S.C. 154(b) by 686 days.

(21) Appl. No.: 11/657,507

(22) Filed: Jan. 23, 2007

(65) Prior Publication Data

US 2008/0175140 A1 Jul. 24, 2008

(51) Int. Cl.
*H04K 1/10* (2006.01)

(52) U.S. Cl. .................. 370/210; 370/203; 370/208; 370/209; 370/375; 370/380; 375/285; 375/347; 375/260

(58) Field of Classification Search ............ 370/210, 370/500–514, 506, 375, 380, 381, 575, 208–209, 370/203; 375/285, 347, 260
See application file for complete search history.

(56) References Cited

U.S. PATENT DOCUMENTS

2005/0243860 A1* 11/2005 Chen et al. ............... 370/465
2006/0013325 A1*  1/2006 Agrawal et al. ........... 375/260
2006/0245349 A1* 11/2006 Vrcelj et al. .............. 370/210
2007/0249380 A1* 10/2007 Stewart et al. ............. 455/502

* cited by examiner

*Primary Examiner*—Charles N Appiah
*Assistant Examiner*—Xiang Zhang

(57) ABSTRACT

The invention provides methods and systems for channel estimation. A method comprises receiving a plurality of signal frames, comprising at least a first zone and a second zone, from a plurality of base stations in the wireless communication system. Two or more first delay profiles corresponding to two or more base stations are determined using the first zone. The method further comprising detecting at least one aliased tap in a time domain channel response of the second zone using the two or more first delay profiles. Another method comprises receiving a signal frame, comprising at least a preamble symbol and a data part, from a base station. A first delay profile corresponding to the preamble symbol is determined and a second delay profile corresponding to the data part is obtained. The first delay profile is analyzed in conjunction with the second delay profile to detect one or more aliased taps in a time domain channel response of the data part. The detected one or more aliased taps are nulled/rectified.

18 Claims, 9 Drawing Sheets

METHODS AND SYSTEMS FOR PERFORMING CHANNELS ESTIMATION IN A WIRELESS COMMUNICATION SYSTEM

FIELD OF INVENTION

The present invention generally relates to wireless communication systems. More specifically, the present invention relates to methods and systems for performing channel estimation in OFDM (Orthogonal Frequency Division Multiplexing) based block transmission systems.

BACKGROUND

In block transmission systems, typically, a base station transmits a preamble symbol in addition to the data symbols. A preamble symbol is, generally, an introductory symbol that may not carry data but is provided to enable the receiver to perform certain tasks such as synchronization, channel estimation, estimation of base station signal strengths etc. The preamble symbol has a higher density of pilot symbols than the rest of the symbols. The preamble symbol does not contain any data.

Further, the data can be transmitted to a mobile station from either a single base station or from a plurality of base stations. For example, in 802.16e, a base station can transmit data packets that are destined specifically for the mobile station on a unicast zone. On the other hand, data packets that are broadcast/multicast by a plurality of base stations can be received by more than one mobile station on a Multicast and Broadcast Service (MBS) zone.

Wireless channels are characterized by multi-path. The transmitted signal undergoes phenomenon like reflection and scattering from various obstacles. This results in multi-path. Consequently, the mobile station may receive the signals with different delays. Also, signals transmitted by the plurality of base stations may not always take a line-of-sight path in reaching the mobile station. The multi-path nature of the channel in the time domain manifests as a frequency selective channel in the frequency domain.

The combined channel of the plurality of base stations differs from a single channel between a base station and a mobile station. The combined channel has a larger delay spread than the single channel. This results in highly frequency selective channels. The large delay spread hurts the channel estimation of the combined channel.

Some of the existing channel estimation methods employ interpolation techniques such as sinc or Fast Fourier Transform (FFT) based interpolation. In such methods, the delay spread of the channel that can be estimated well is limited.

There is therefore a need for methods and systems for channel estimation such that a delay spread of a channel that can be estimated well is increased and the channel estimation performance is improved.

SUMMARY

An embodiment provides methods and systems for performing channel estimation in a wireless communication system. The method comprises receiving a plurality of signal frames from a plurality of base stations in the wireless communication system. Each of the plurality of signal frames comprises a first zone and a second zone. In an embodiment, the plurality of base stations transmits a different signal on the first zone, and signals that are exactly identical in nature on the second zone. In another embodiment, at least a group of base stations from the plurality of base stations transmit signals that are identical in nature on the second zone.

The method, further, comprises determining two or more first delay profiles corresponding to two or more base stations of the plurality of base stations. The two or more base stations can belong to an active set of base stations or a candidate set of base stations corresponding to the mobile station. The two or more first delay profiles are determined using the first zones of the two or more base stations. The two or more first delay profiles can be a power delay profile or a tap delay profile. Furthermore, the method comprises using the two or more first delay profiles to detect one or more aliased taps in the time domain channel response of the second zone.

Another embodiment provides a method of performing channel estimation in a wireless communication system, where a signal frame is received from a base station. The signal frame comprises at least the first zone. Further, the first zone comprises a preamble symbol and a data part of the first zone. The method comprises determining a third delay profile corresponding to the preamble symbol and obtaining a fourth delay profile corresponding to the data part of the first zone. The fourth delay profile is, then, analyzed in conjunction with the third delay profile to detect one or more aliased taps in the time domain channel response of the data part of the first zone. Further, the time domain channel response corresponding to the data part of the first zone is corrected by either nulling the one or more aliased taps or by rectifying the one or more aliased taps using a module offset technique.

Further, an embodiment provides a system for performing channel estimation in a wireless communication system. The system is adapted to function at least in a first zone and a second zone. The system comprises a first transceiver, a memory and a first processor. The first transceiver can be configured for the reception of the plurality of signal frames from the plurality of base stations in the wireless communication system. The first processor can be operatively coupled to the memory and the first transceiver. Moreover, the first processor can be configured for determining the two or more first delay profiles using the first zone. Furthermore, the two or more first delay profiles can be used by extending the configuration of the first processor to detect one or more aliased taps in a time domain channel response of the second zone.

An embodiment also provides a system that is adapted to function at least in the first zone. The system uses a preamble symbol of a signal frame to detect one or more aliased taps in the time domain channel response of a data part of the first zone.

BRIEF DESCRIPTION OF DRAWINGS

A more complete appreciation of the present invention is provided by reference to the following detailed description when considered in conjunction with the accompanying drawings in which reference symbols indicate the same or similar components, wherein.

Figure 1:
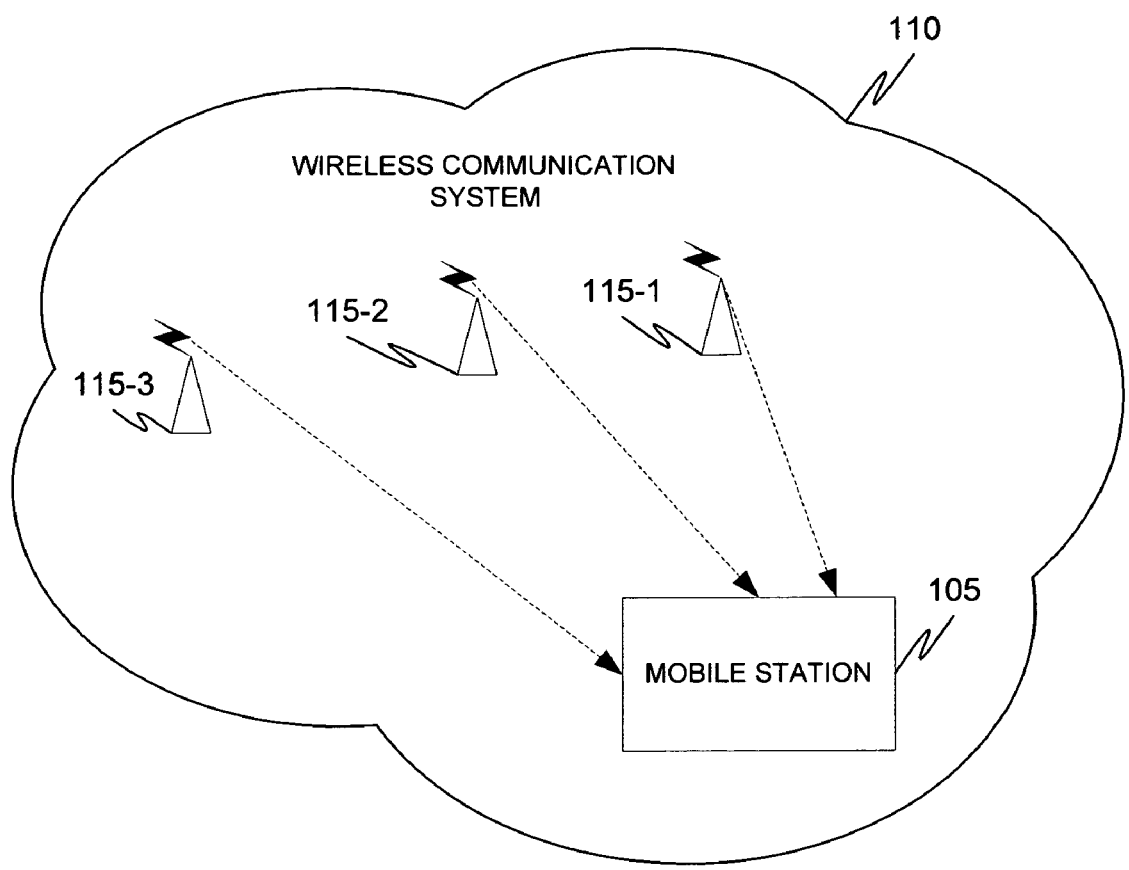
FIG. 1 illustrates a mobile station in communication with a plurality of base stations in a wireless communication system, in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE DRAWINGS

While embodiments may be described in many different forms, some of which are shown in the figures and described herein in detail, it is understood that the present disclosure is to be considered as an example of the principles of the present invention and not intended to limit the invention to the specific embodiments shown and described. Further, the terms and words used herein are not to be considered limiting, but rather merely descriptive. It will also be appreciated that for simplicity and clarity of illustration, common and well-understood elements that are useful or necessary in a commercially feasible embodiment may not be depicted in order to facilitate a less obstructed view of these various embodiments. Also, elements shown in the figures have not necessarily been drawn to scale. For example, the dimensions of some of the elements are exaggerated relative to each other. Further, where considered appropriate, reference numerals have been repeated among the figures to indicate corresponding elements.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the present invention described herein may be comprised of one or more conventional processors and unique stored program instructions that control the one or more processors to implement, in conjunction with certain non-processor circuits, some, most, or all of the functions of methods and systems for performing channel estimation in a wireless communication system described herein. The non-processor circuits may include, but are not limited to, a radio receiver, a radio transmitter, signal drivers, clock circuits, power source circuits, and user input devices. As such, these functions may be interpreted as steps of a method to perform channel estimation in a wireless communication system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In accordance with various embodiments, methods and systems for performing channel estimation in a wireless communication system are provided. In one embodiment, the wireless communication system can be a block transmission system. Some of the examples of block transmission systems are Orthogonal Frequency-Division Multiplexing (OFDM) systems, Multi-Carrier Code Division Multiple Access (MC-CDMA) system, Orthogonal Frequency Division Multiple Access (OFDMA) system, Discrete Multi-Tone (DMT) system and the like. The IEEE 802.16d and the IEEE 802.16e wireless Metropolitan Area Network (MAN) standards, which use OFDM-like technology, are also examples of block transmission systems.

Referring to FIG. 1, a mobile station 105 in communication with a plurality of base stations in a wireless communication system 110 is shown in accordance with an embodiment. The wireless communication system 110 can comprise a plurality of mobile stations and a plurality of base stations, collectively referred to herein as 115-*n*, where 115-*n* can depict one or more of a base station 115-1, a base station 115-2 and a base station 115-3. The plurality of mobile stations can be in communication with plurality of base stations 115-*n*. One of the plurality of mobile stations is depicted as mobile station 105. An active set of base stations or a candidate set of base stations corresponding to mobile station 105 can comprise one or more base stations from plurality of base stations 115-*n*.

An active set of base stations is a set of the base stations, say M base stations, with the strongest signal strength among all base stations. In other words, if we order the base stations in decreasing order of signal strength, the first M of them constitute the active set. These base stations are actively tracked by the mobile station for various purposes and hence this information is typically available for example from an active set tracking block or function.

Plurality of base stations 115-*n* can be in communication with mobile station 105 and can transmit a plurality of data bursts to mobile station 105. The plurality of data bursts can be transmitted to mobile station 105 using a first zone or a second zone or both. For example, mobile station 105 may request to download an audio application from base station 115-1 through wireless communication system 110. Base station 115-1, on receiving the request from mobile station 105, may transmit data bursts pertaining to the audio application to mobile station 105 through wireless communication system 110 on the first zone. For example, in 802.16e, the data bursts can be transmitted to mobile station 105 in a unicast transmission mode if the data bursts are destined specifically for mobile station 105.

In an embodiment, contrary to the first zone, the second zone carries identical information from plurality of base stations 115-*n* to one or more mobile stations. In another embodiment, for instance during a soft handoff, a group of base stations from the plurality of base stations transmits signals that are identical in nature on the second zone. Specifically, the same information is transmitted to one or more mobile stations in the wireless communication system. For instance, in an embodiment, wireless communication system 110 may comprise a video server (not shown). The video server may serve as a platform for networked TV channels that can send packets of audio/visual data on the second zone, to plurality of base stations 115-$n$. Plurality of base stations 115-$n$ may then forward the packets in the second zone to one or more mobile stations in wireless communication system 110. Consequently, each of the one or more mobile stations may receive the same audio/visual data bursts transmitted by the video server on the second zone. A similar example of transmission in the second zone is the broadcast or multicast transmission in 802.16e where same data bursts are sent over the second zone to one or more mobile stations. Another example is where a group of base stations send the same data bursts over the second zone during a soft hand-off process with a mobile station. In this case the data bursts may be destined for a single mobile station.

Figure 2:
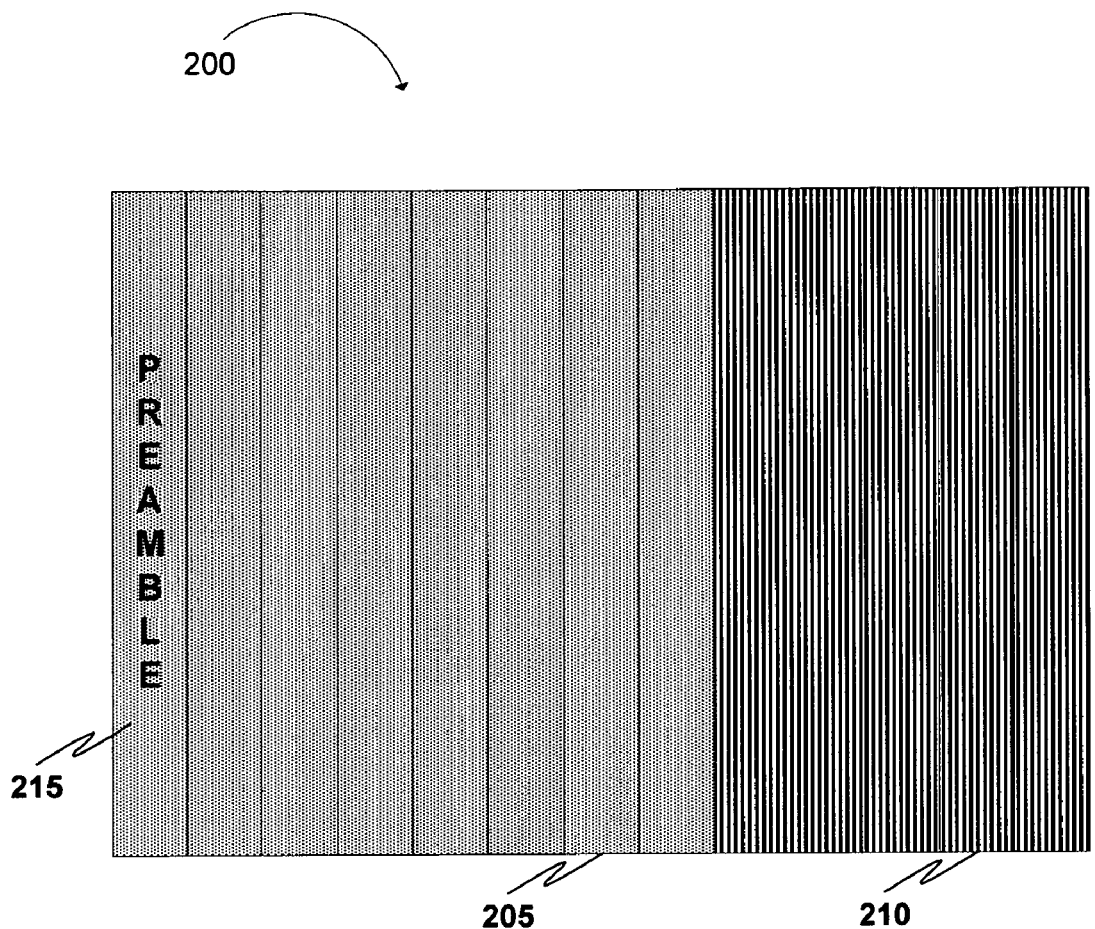
FIG. 2 illustrates an exemplary depiction of a signal frame in accordance with an embodiment.

Turning now to FIG. 2, an exemplary depiction of a signal frame 200 is shown in accordance with an embodiment. Mobile station 105 can receive signal frame 200 from plurality of base stations 115-$n$. Signal frame comprises at least a first zone 205 and a second zone 210. A preamble symbol 215 and a data part are also obtained in first zone 205. For instance, during a broadcast transmission in 802.16e, plurality of base stations 115-$n$ can transmit identical data packets to mobile station 105 on second zone 210. Further, during a unicast transmission in 802.16e, at least one of plurality of base stations 115-$n$ can transmit data packets, which are destined specifically for mobile station 105, to mobile station 105.

In an embodiment, mobile station 105 can receive a signal frame comprising both first zone 205 and second zone 210. In this embodiment, mobile station 105 can perform channel estimation for a combined channel corresponding to at least some of the plurality of base stations 115-$n$ in the second zone 210, using first zone 205 in conjunction with second zone 210. A method of this embodiment is described in detail in conjunction with FIG. 3 and FIG. 4.

In another embodiment, mobile station 105 can receive data destined for it in the first zone from a base station, say base station 115-1. In this embodiment, mobile station 105 can perform channel estimation for a channel between base station 115-1 and mobile station 105 using preamble symbol 215 in conjunction with a data part of first zone 205. A method of this embodiment is described in detail in conjunction with FIG. 7.

Those skilled in the art will realize that first zone 205 and second zone 210 are merely a group of symbol(s). The group of symbols need not be consecutive or in the order shown in FIG. 2. For instance, parts of first zone and second zone may be dispersed throughout signal frame 200. Further, in an embodiment, signal frame 200 may have other symbols. Moreover, the present invention is also applicable for signal frames that do not have second zone and signal frames that do not have first zone.

Figure 3:
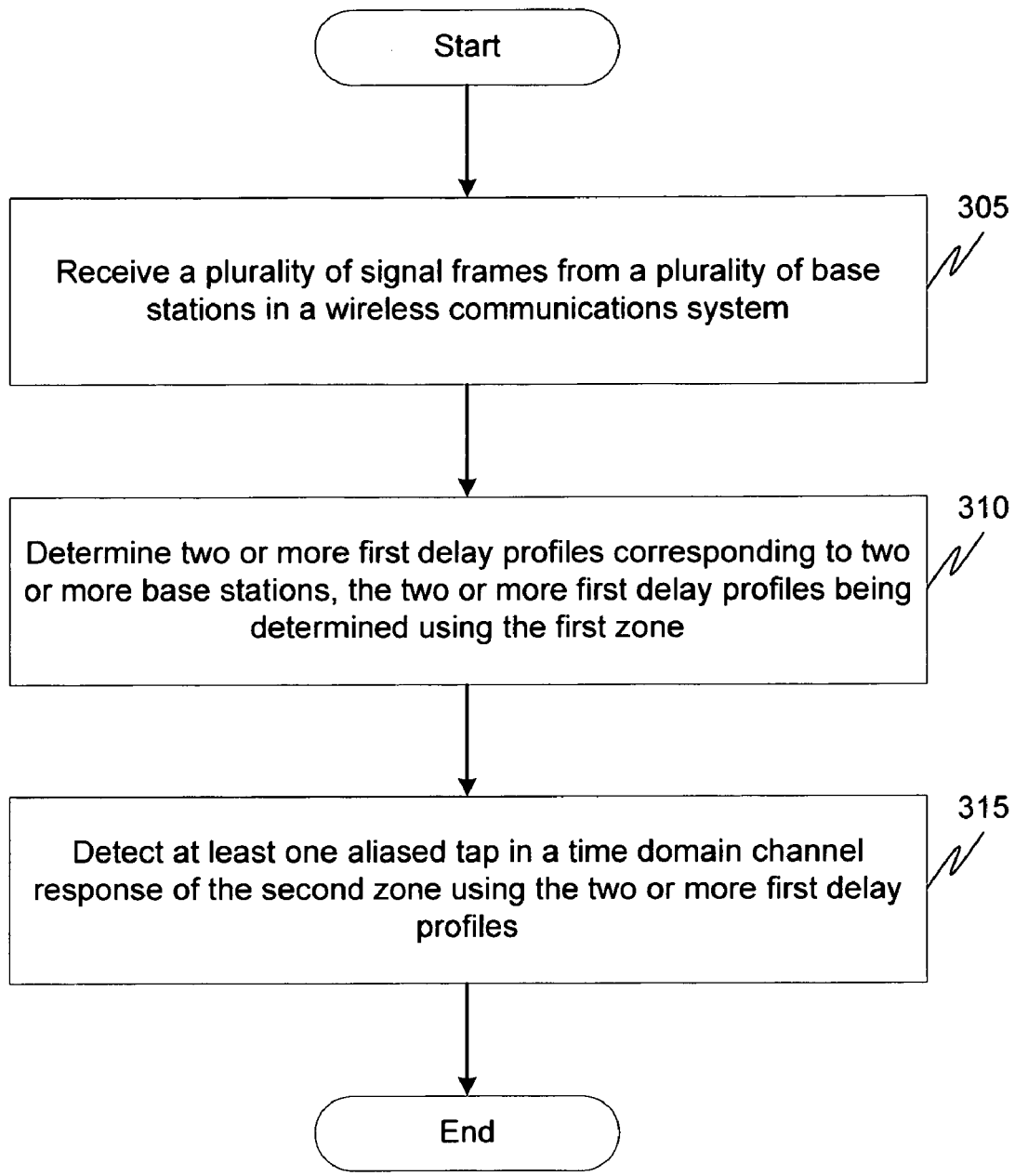
FIG. 3 is a flowchart for performing channel estimation in a wireless communication system, in accordance with an embodiment.

Turning now to FIG. 3, a flowchart for performing channel estimation in wireless communication system 110 is shown in accordance with an embodiment. At 305, a plurality of signal frames, similar to signal frame 200, are received by mobile station 105 from plurality of base stations 115-$n$. Those skilled in the art will realize that the plurality of signal frames is received at mobile station 105 as a sum of the plurality of signal frames after passing through the channels corresponding to the plurality of base stations. Each of the plurality of signal frames can comprise at least a first zone and a second zone. As mentioned earlier, the first zone is defined as a zone which contains distinct data destined for distinct mobiles. On the contrary, the second zone is defined as a zone in which plurality of base stations 115-$n$ transmit signals that are identical in nature, to mobile station 105.

For example, mobile station 105 can be subscribed to a gaming service provided by a game server in wireless communication system 110. The game server may need to send periodic updates to a plurality of mobile stations that are subscribed to the gaming service. For this purpose, the updates are sent to plurality of base stations 115-$n$. Plurality of base station 115-$n$ can then route all data packets pertaining to the updates to mobile station 105 on the second zone. In another instance, mobile station 105 can send a download request to the game server for downloading a gaming application. In response to the download request, the gaming server can route the data packets pertaining to the gaming application to base station 115-3. The base station 115-3 can then forward these data packets to mobile station 105 on the first zone.

At 310, two or more first delay profiles corresponding to two or more base stations from plurality of base stations 115-$n$ are determined. Each of the two or more first delay profiles can be a power delay profile or a tap delay profile. A representation of the power of signal frames received from base stations versus the delay is referred to as the "Power Delay Profile". Further, a tap delay profile represents the delays at which the channel has significant energy without reference to the power on the taps. The first zone is used to determine the two or more first delay profiles of two or more base stations. In an embodiment, the first zone comprises a preamble symbol, as depicted in FIG. 2. In accordance with an embodiment, the preamble symbol can be used to determine the two or more first delay profiles corresponding to two or more base stations. A preamble symbol is, generally, an introductory symbol that may not carry data but is provided to enable the receiver, in this case mobile station 105, to perform some tasks such as, but not limited to, synchronization, channel estimation, estimation of base station signal strengths etc.

The first zone can further comprise a data part. The data part of the first zone can contain data packets destined for mobile station 105. Both, the preamble symbol and the data part, contain one or more pilot tones. The one or more pilot tones are generally employed as reference signals for various purposes such as channel estimation, synchronization etc.

An efficient channel estimation of a combined channel of two or more base stations can be performed by interpolating the channel estimates in the time and frequency domain using the one or more pilot tones. In order to interpolate the channel estimates of the two or more base stations using a simple sinc interpolation technique, the pilot spacing in terms of number of tones must be at least $N_{FFT}/D_{Max}$, where $N_{FFT}$ is total number of tones in an OFDM symbol and $D_{Max}$ is the maximum delay spread of the channel in terms of OFDM samples. Those skilled in the art will realize that if the pilot spacing is more, or equivalently, if the pilot density is lower, the channel estimation would have errors. Generally, the pilot density in the data part of the first zone is lower compared to the pilot density in the preamble symbol of the first zone. The preamble symbol does not carry data and therefore can have a higher pilot density. In conventional methods, if the spacing between the one or more pilot tones is K, then a delay spread of the channel that can be estimated well is limited to $N_{FFT}/K$. For example, in the 802.16e standard, the pilot spacing in a preamble symbol is 3, and that of FUSC (Full Usage of Sub-Channels) is 12. Consequently, if the conventional methods are used, the delay spread of the channel that can be estimated on the preamble symbol is $N_{FFT}/3$ and that on the data part is $N_{FFT}/12$. Thus the delay spread of the channel that can be estimated is more for the preamble than for the FUSC zone.

In accordance with an embodiment, the preamble symbol can be used to estimate the delay spread on the data part of the first zone. Thus, an improved channel estimation corresponding to the pilot spacing of $N_{FFT}/3$ can be obtained on the data part of the first zone, if the preamble symbol is used in conjunction with the data part for channel estimation.

Referring back to FIG. 3, at 315 the two or more first delay profiles corresponding to the two or more base stations are used to detect one or more aliased taps in the time domain channel response of the second zone. The time domain channel response can be obtained based on, for instance, Inverse Fast Fourier Transform (IFFT).

Figure 4:
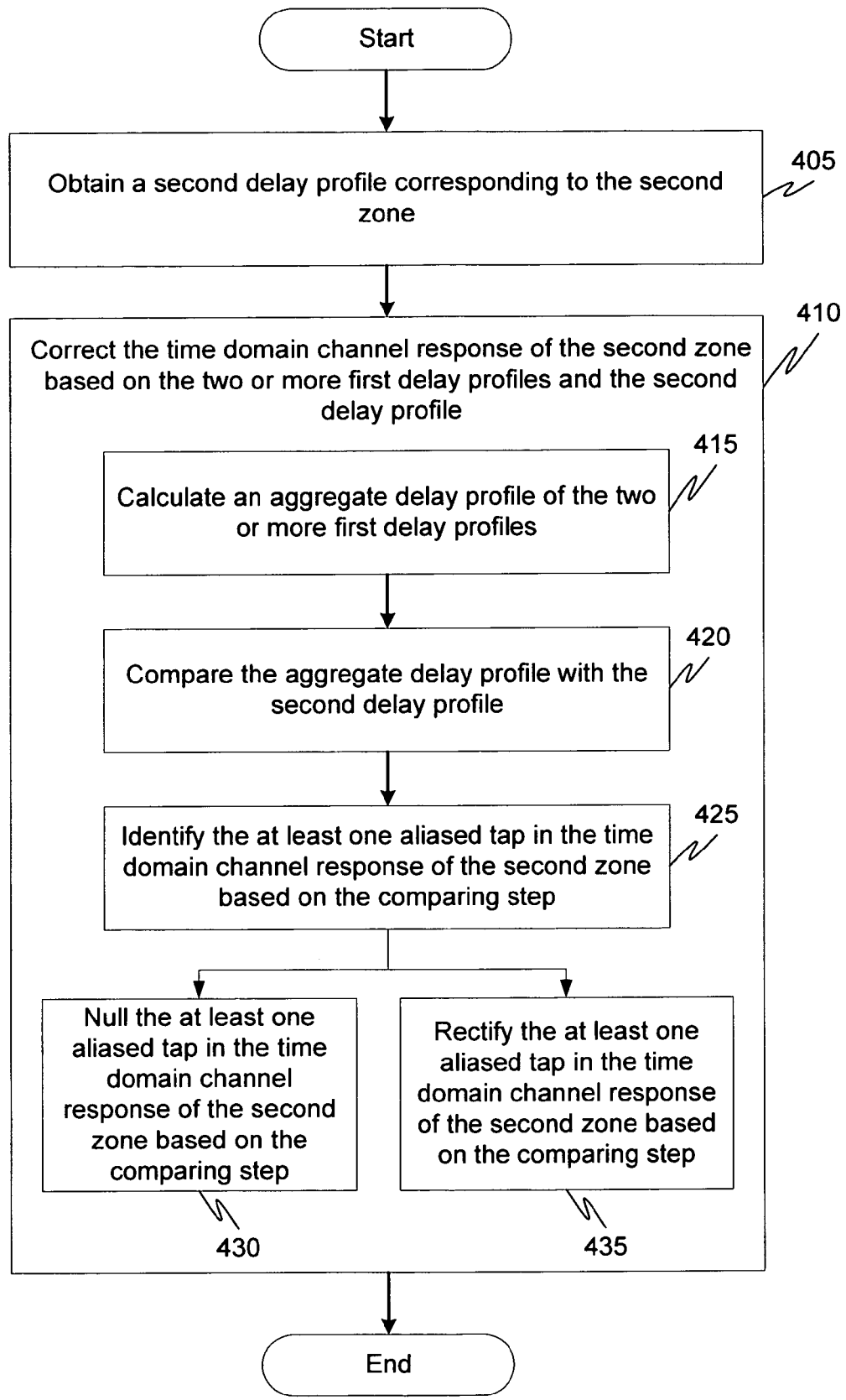
FIG. 4 is a flowchart for detecting one or more aliased taps in a time domain channel response of a second zone, in accordance with an embodiment.

Turning now to FIG. 4, a flowchart for detecting one or more aliased taps in the time domain channel response of a second zone is shown in accordance with an embodiment. As mentioned in conjunction with FIG. 3, the two or more first delay profiles of the two or more base stations are used at 315 to detect one or more aliased taps in the time domain channel response of the second zone. FIG. 4 describes the detection step, step 315, in detail. The detection of one or more aliased taps at step 315 comprises obtaining a second delay profile corresponding to the second zone at 405. The second delay profile can be a power delay profile or a tap delay profile. The power delay profile and the tap delay profile are explained in conjunction with FIG. 3 above. Based on the two or more first delay profiles and the second delay profile, the time domain channel response of the second zone is corrected at 410. For correcting the time domain channel response of the second zone, an aggregate delay profile of the two or more first delay profiles is calculated at 415.

If the two or more first delay profiles are power delay profiles, the aggregate delay profile is the sum of the two or more first delay profiles of the two or more base stations. Alternatively, if the two or more first delay profiles are a tap delay profile, the aggregate delay profile is a union of the two or more first delay profiles. In an embodiment, only the top M base stations can be considered, such that the aggregated power of the aggregate delay profile is maximum for those M base stations, but the embodiment is not so limited. In another embodiment, the first delay profiles of the first $M_1$ (where $M_1 < M$) base stations of the M base stations can also be considered. Typically a mobile station, in this case the mobile station 105, determines the top M base stations for various purposes. This is more so in wireless communication systems such as the 802.16e.

Figure 5A:
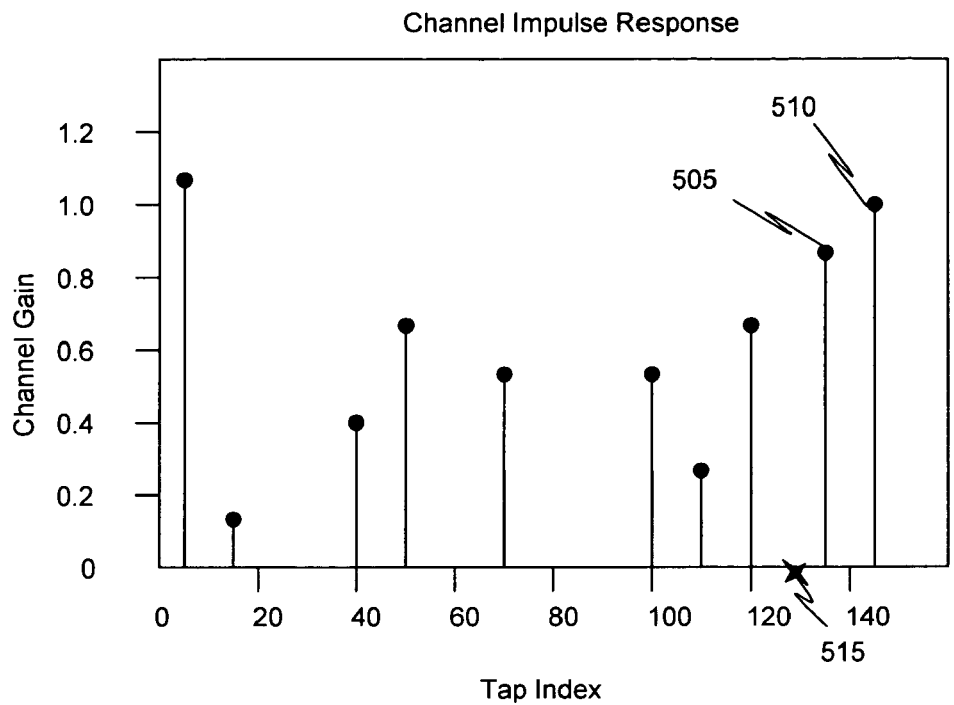
FIGS. 5A and 5B are an exemplary representation of an aliasing phenomenon, in accordance with an embodiment.

If a delay spread of a channel is larger than $N_{FFT}/K$ (where K is the pilot spacing) and channel estimation is performed using Fast Fourier Transform (FFT) based interpolation technique, the phenomenon of aliasing may occur. An example of the aliasing phenomenon is illustrated in conjunction with FIG. 5A and FIG. 5B. For instance, consider a case in which the pilot spacing K is 8 and $N_{FFT}$ is 1024, for the sake of simplicity. The maximum delay spread of the channel that can be estimated is 1024/8 or 128 taps. FIG. 5A shows an example of a true Channel Impulse Response (CIR) where there are taps beyond tap index 128, in accordance with an embodiment. Let the CIR function be denoted by h(n) where n is the tap index. Discarding the effects of guard bands, the channel estimate employing FFT interpolation technique with a pilot spacing of 8 as described above, can be mathematically represented as $$h(n) = \sum_{p=0}^{7} h(n + 128p)$$

Figure 5B:
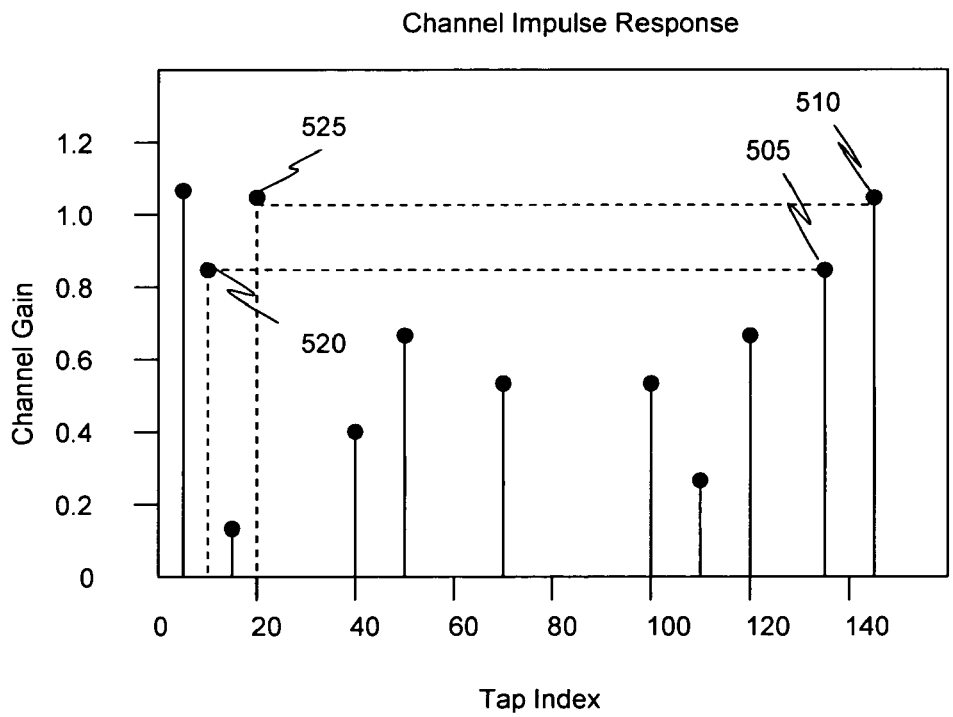

The aliasing of taps, where the taps beyond the index 128 are effectively aliased back within the first 128 tap window, is illustrated in conjunction with FIG. 5B. The phenomenon of aliasing may induce errors in the channel estimates.

The aliasing of taps caused in the aggregate delay profile is less than the aliasing of taps caused in the second delay profile.

Thus, subsequent to the calculation of the aggregate delay profile, the aggregate delay profile is compared with the second delay profile at 420. On comparing the aggregate delay profile with the second delay profile, one or more aliased taps in the time domain channel response of the second zone can be identified at 425. The correction of the time domain channel response of the second zone can also account for a leakage effects or a windowing effects resulting from a frequency domain to time domain conversion.

In an embodiment, upon identifying the one or more aliased taps in the time domain channel response of the second zone, the one or more aliased taps are nulled at 430. Nulling an aliased tap implies that the aliased tap is 'zeroed' or deleted from the time domain channel response. In an alternate embodiment, the one or more aliased taps are rectified based on a modulo offset technique at 435. Rectifying implies that the one or more aliased taps are deleted and then placed in the correct location in the time domain channel response of the second zone. This is done by shifting the one or more aliased taps by a value equal to a multiple of $N_{FFT}/K_2$ where $K_2$ is the pilot density in the second zone. By doing so, a tap location index modulo $N_{FFT}/K_2$ remains unchanged. Further, if an aliased tap is shifted by $N_{FFT}/K_2$, then it is moved into a second window. If the aliased tap is shifted by $2N_{FFT}/K_2$, then it is moved into a third window.

For instance, in accordance with an embodiment, the pilot spacing in the preamble symbol can be assumed to be $K_1$ and the pilot spacing in the data of the second zone can be assumed to be $K_2$. Thus, $K_1$ may be assumed to be smaller than $K_2$. Further consider the case when the delay spread of the channel is less than or equal to $(2 N_{FFT}/K_2)$. This is known to a mobile station by observing the channel estimate obtained on the preamble. Consequently, this consists of two windows or less of the length of the channel that can be estimated with a pilot spacing of $K_2$. In this situation any aliased taps are known to occur from the second window, since a third window does not exist. Thus all detected aliased taps are move into the second window by simply shifting them to the left by $N_{FFT}/K_2$. Note that their value, modulo $N_{FFT}/K_2$ does not change. In a different embodiment, these taps may be nulled instead of shifting.

Thus, by detecting and nulling/rectifying the aliased taps in the time domain channel response of the second zone, a better channel estimation of the combined channel of the plurality of base stations can be performed for in the second zone.

In an embodiment, when a mobile station has multiple receive antennas, the tap delay profile or the power delay profile can be obtained for all or a subgroup of transmit and receive antenna pairs together. These tap delay profiles or power delay profiles, together, can be used to correct the aliasing at the receive antennas. This may be suitable in fast fading channels. Alternatively, in another embodiment, the power delay profile or tap delay profile from only a transmit and receive antenna pair of interest may be used. This may be suitable in slow fading channels. The power delay profile or the tap delay profile can be obtained by averaging channel responses over multiple signal frames or across both the preamble symbol and a midamble symbol, if both are present.

Referring to FIG. 5A and FIG. 5B, an exemplary representation of an aliasing phenomenon is shown in accordance with an embodiment. Consider the abovementioned example, wherein the pilot spacing K is assumed to be 8 and $N_{FFT}$ is assumed to be 1024. Since the maximum delay spread of the channel that can be estimated is 1024/8 or 128 taps, taps occurring beyond a tap index 128 can be aliased. A tap delay profile represented in FIG. 5A is a true channel impulse response. In accordance with FIGS. 5A and 5B, a tap 505 and a tap 510 are located beyond tap index 128, denoted by 515. Consequently, both, tap 505 and tap 510, can get aliased to locations represented by an aliased tap 520 and an aliased tap 525 respectively as illustrated in FIG. 5B. In accordance with the methods and systems provided by the present invention, aliased tap 520 and aliased tap 525 can be detected so as to correct the CIR.

The correction of CIR estimate can be performed as long as the aliased taps do not overlap with the taps already existing in the first window. In reality, taps of a channel are very few in number and have significant spread between them that account for the sparse nature of the channel. Due to the sparse nature of a channel, a good performance gain can be achieved by employing the first zone in conjunction with the second zone for performing channel estimation of the combined channel of plurality of base stations 115-$n$. For instance, in the 802.16e example, the unicast information can be used in conjunction with broadcast or multicast information for performing channel estimation.

In reality, factors such as noise, interference and other effects contribute to the generation of low energy taps that occur around a high energy tap or elsewhere. These low energy taps can be ignored by considering only those taps that are above a certain energy threshold in determining the tap locations of interest. In the example described above, only the tap locations and not their power has been made use of from the first zone. In the 802.16e example, where unicast information is used for channel estimation during a broadcast, if the channel is known to fade slowly, and the time gap between the unicast and broadcast transmission is small, the power of the taps from the first zone can also be used for correcting the CIR estimate.

Figure 6A:
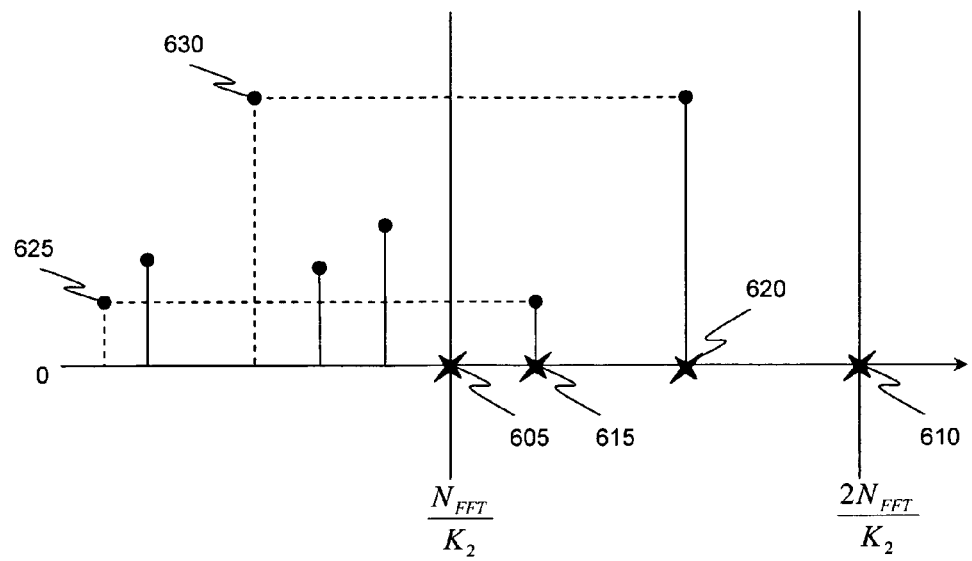
FIG. 6A and FIG. 6B are an exemplary representation depicting aliased taps in a second and a third window of a CIR, in accordance with an embodiment.
Figure 6B:
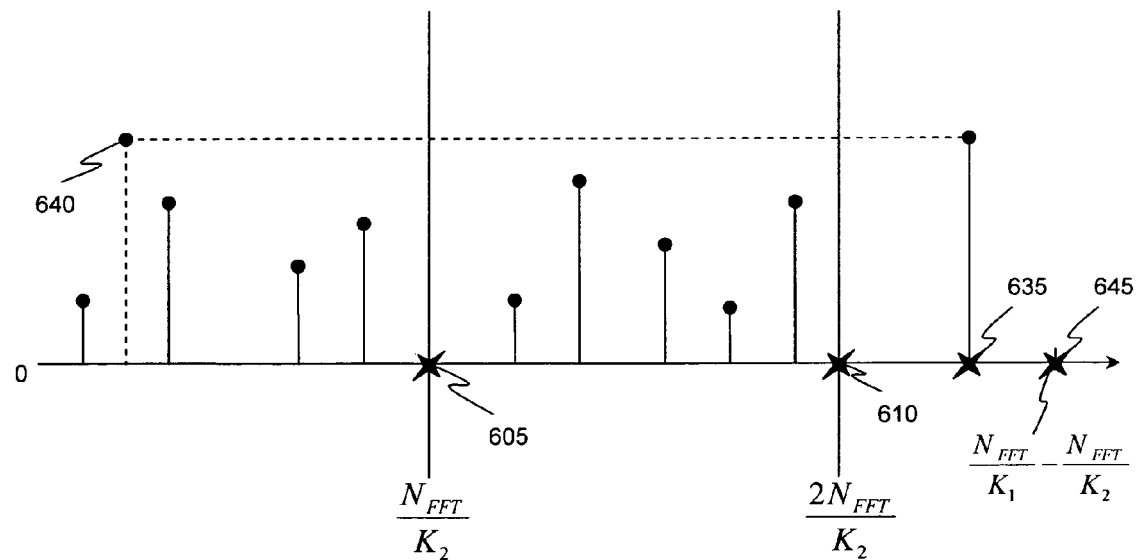

Referring now to FIG. 6A and FIG. 6B, an exemplary representation depicting aliased taps in a second and a third window of a CIR is shown in accordance with an embodiment of the present invention. FIG. 6A depicts a scenario where the aggregate delay profile implies that a delay spread of the channel is more than $N_{FFT}/K_2$, 605, but less than or equal to $2N_{FFT}/K_2$, 610. This consists of two windows or less, of the length of the channel that can be estimated with a pilot spacing of $K_2$. Taps at a tap location 615 and a tap location 620 are aliased and are reflected in the first window as an aliased tap 625 and an aliased tap 630, respectively. Thus, in this case, aliased tap 625 and aliased tap 630 are assumed to occur from the second window, since the delay spread of the channel extends only till the second window. In accordance with the present invention, aliased tap 625 and aliased tap 630 can be moved to tap location 615 and tap location 620, respectively.

FIG. 6B depicts a scenario where the aggregate delay profile implies that a delay spread of the channel is more than $2N_{FFT}/K_2$, 610. In this case, it can be difficult to determine whether an aliased tap originated from the second window or the third window. One or more aliased taps up to tap location $(N_{FFT}/K_1 - N_{FFT}/K_2)$ can be corrected and moved to the second or the third window correctly since the tap location information is available up to a delay spread of $N_{FFT}/K_1$. Therefore, if there are aliased taps at locations that cannot be attributed to the locations determined from the aggregate delay profile in the first and the second window, then, the aliased taps may have occurred from the third window. Those skilled in the art will realize that if $(N_{FFT}/K_1 - N_{FFT}/K_2)$ is equal to or greater than $(2N_{FFT}/K_2)$ then aliasing can be corrected, including those originating from the third window. For example, tap at a tap location 635 can be reflected in the first window as an aliased tap 640. Since $(N_{FFT}/K_1 - N_{FFT}/K_2)$ 645 is greater than $2N_{FFT}/K_2$, 610, aliased tap 640 can be detected and can be moved to the tap location 635. In some cases, where $(N_{FFT}/K_1 - N_{FFT}/K_2)$ is small, the delay spread information from the aggregate delay profile may not help determine the window from where an aliased tap originates from. However, it is known in the art that the energy of the taps in a channel, on an average, decreases with delay. Hence, such taps may be attributed to the second window with greater probability.

Figure 7:
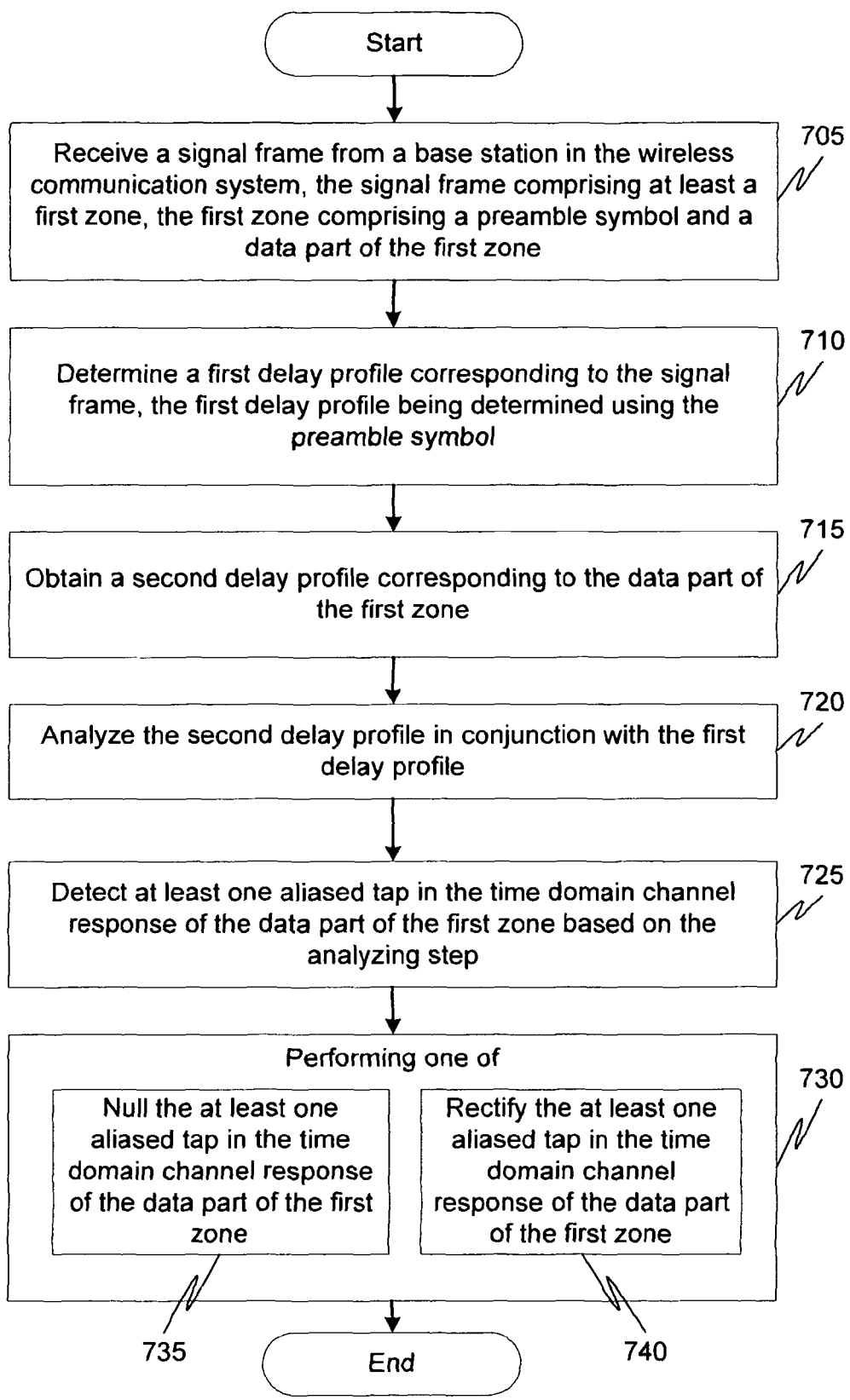
FIG. 7 is a flowchart for performing channel estimation in a wireless communication system using a first zone, in accordance with an embodiment.

Turning now to FIG. 7, a flowchart of a method for performing channel estimation using a first zone in a wireless communication system is shown in accordance with an embodiment. A signal frame can be received by mobile station 105 from a base station, say base station 115-1, in wireless communication system 110, at 705. The signal frame can comprise at least the first zone. For instance, in the 802.16e example, the signal frame can be received in a unicast transmission mode. As mentioned earlier, the first zone can comprise a preamble symbol and a data part. A first delay profile corresponding to the signals frame is determined at 710 using the preamble symbol. Those skilled in the art will appreciate that the first delay profile of FIG. 7 is different from the two or more first delay profiles of FIG. 3 and FIG. 4. Hence, for clarity purposes, the first delay profile of FIG. 7 is hereinafter referred to as third delay profile. The third delay profile can be a power delay profile or a tap delay profile.

Further, a second delay profile is obtained corresponding to the data part of the first zone at 715. Those skilled in the art will appreciate that the second delay profile of FIG. 7 is different from the second delay profile of FIG. 3 and FIG. 4. Hence, for clarity purposes, the second delay profile of FIG. 7 is hereinafter referred to as fourth delay profile. The fourth delay profile can be a power delay profile or a tap delay profile. For instance, referring back to FIG. 1, mobile station 105 can receive a signal frame in the unicast zone from base station 115-1. Mobile station 105, then, determines a third delay profile corresponding to the preamble symbol of the signal frame and obtains the fourth delay profile corresponding to the data part of the first zone.

The fourth delay profile is analyzed at 720 in conjunction with the third delay profile. During the analysis of the fourth delay profile at 720, the third delay profile is compared to the fourth delay profile and one or more aliased taps are detected in the fourth delay profile. The analysis of the fourth delay profile at 720 can be performed in a similar manner to the detection of the one or more aliased taps in the time domain channel response of the second zone at 425, of FIG. 4 above. Specifically, the third delay profile being determined using the preamble symbol gives a better channel estimate than the fourth delay profile, which is obtained using the data part of the first zone. This is because the preamble symbol has a higher pilot density than the data part of the first zone, as mentioned earlier. At 725, one or more aliased taps are detected in the time domain channel response of the data part of the first zone, based on the analysis of the fourth delay profile in conjunction with the third delay profile.

Upon detecting the one or more aliased taps, the method comprises performing, at 730, at least one of two embodiments. In one embodiment, the one or more aliased taps can be nulled from the time domain channel response of the data part as shown at 735. Nulling a tap implies that it is 'zeroed' or deleted from the time domain channel response. In another embodiment, the one or more aliased taps can be rectified in the time domain channel response of the data part of the first zone based on a modulo offset technique as shown at 740. Rectifying implies that the one or more aliased taps are deleted and then placed in the correct location in the time domain channel response of the data part of the first zone. This is done by shifting the one or more aliased taps by a value equal to a multiple of $N_{FFT}/K_2$ where $K_2$ is the pilot density in the time domain channel response of the data part of the first zone. Note that by doing so a tap location index modulo $N_{FFT}/K_2$ remains unchanged. If an aliased tap is shifted by $N_{FFT}/K_2$, then it is moved into the second window. If an aliased tap is shifted by $2N_{FFT}/K_2$, then it is moved into the third window.

Figure 8:
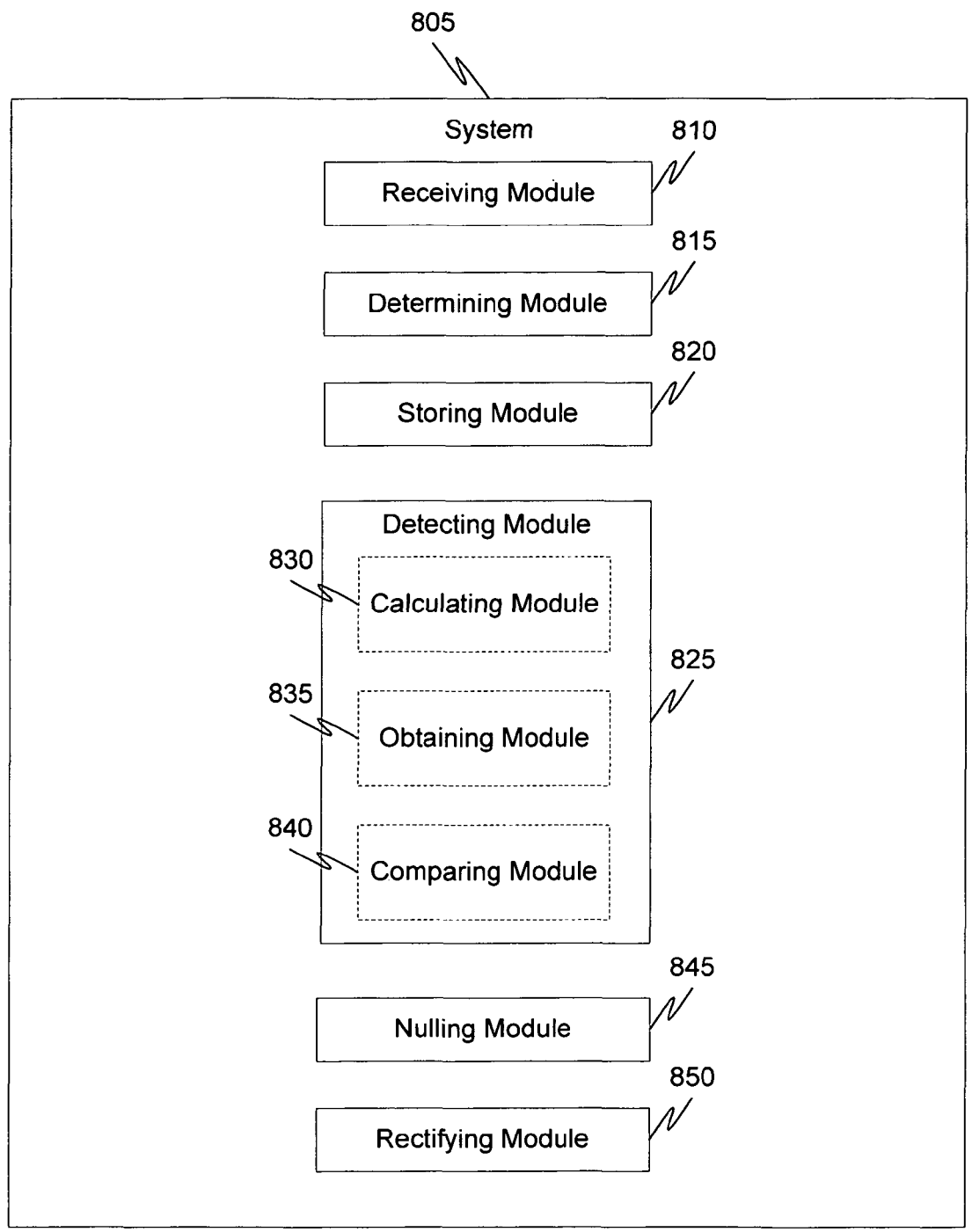
FIG. 8 is a block diagram of a system for performing channel estimation in a wireless communication system, in accordance with an embodiment.

Turning now to FIG. 8, a block diagram of a system 805 for performing channel estimation in a wireless communication system is shown in accordance with an embodiment. According to an embodiment, system 805 can be hosted on mobile station 105. Mobile station 105 can be, for example, but not limited to, a personal computer, a laptop, a mobile phone and a personal digital assistant.

System 805 comprises a receiving module 810 to receive a plurality of signal frames from plurality of base stations 115-$n$ in wireless communication system 110. Receiving module 810 receives the plurality of signal frames as a sum of the plurality of signal frames after passage through the wireless channels corresponding to the base stations Each of the plurality of signal frames can comprise a first zone and a second zone, as mentioned in conjunction with FIG. 2 above.

System 805 further comprises a determining module 815 to determine two or more of first delay profiles corresponding to two or more base stations of plurality of base stations 115-$n$, as already described in conjunction with FIG. 3 above. The two or more base stations can belong to an active set of base stations or a candidate set of base stations corresponding to mobile station 105. The two or more first delay profiles are determined using the first zone. Each of the two or more first delay profiles can be a power delay profile or a tap delay profile. A storing module 820 can be configured to store the two or more first delay profiles determined by determining module 815.

Further, system 805 can comprise a detecting module 825 that uses the two or more first delay profiles of the two or more base stations to detect one or more aliased taps in a time domain channel response of the second zone. The detection of the one or more aliased taps is described in detail above. System 805 can be adapted to function in the first zone as well as in the second zone, since system 805 uses the first zone to correct a time domain channel response of the second zone. For instance, in the 802.16e example, system 805 can be adapted to function in a unicast transmission mode and in a broadcast transmission mode.

For detecting the one or more aliased taps in the time domain channel response of the second zone, detecting module 825 can comprise a calculating module 830 that calculates an aggregate delay profile, corresponding to the two or more first delay profiles. Additionally, detecting module 825 comprises an obtaining module 835 for obtaining a second delay profile corresponding to the second zone. The second delay profile can be one of a power delay profile and a tap delay profile. A comparing module 840 can, subsequently, compare the aggregate delay profile with the second delay profile to detect the one or more aliased taps in the time domain channel response of the second zone. In an embodiment, system 805 can further comprise a nulling module 845 for performing a nulling operation on the one or more aliased taps in the time domain channel response of the second zone. As mentioned earlier, nulling an aliased tap implies that the aliased tap is 'zeroed' or deleted from the time domain channel response. In an alternate embodiment, system 805 can comprise a rectifying module 850 for performing a rectifying operations on the one or more aliased taps based on a modulo offset technique. Rectifying implies that the one or more aliased taps are deleted and then placed in the correct location in the time domain channel response of the second zone. This is done by shifting the one or more aliased taps by a value equal to a multiple of $N_{FFT}/K_2$ where $K_2$ is the pilot density in the second zone. By doing so, a tap location index modulo $N_{FFT}/K_2$ remains unchanged. Further, if an aliased tap is shifted by $N_{FFT}/K_2$, then it is moved into a second window. If the aliased tap is shifted by $2N_{FFT}/K_2$, then it is moved into a third window.

Figure 9:
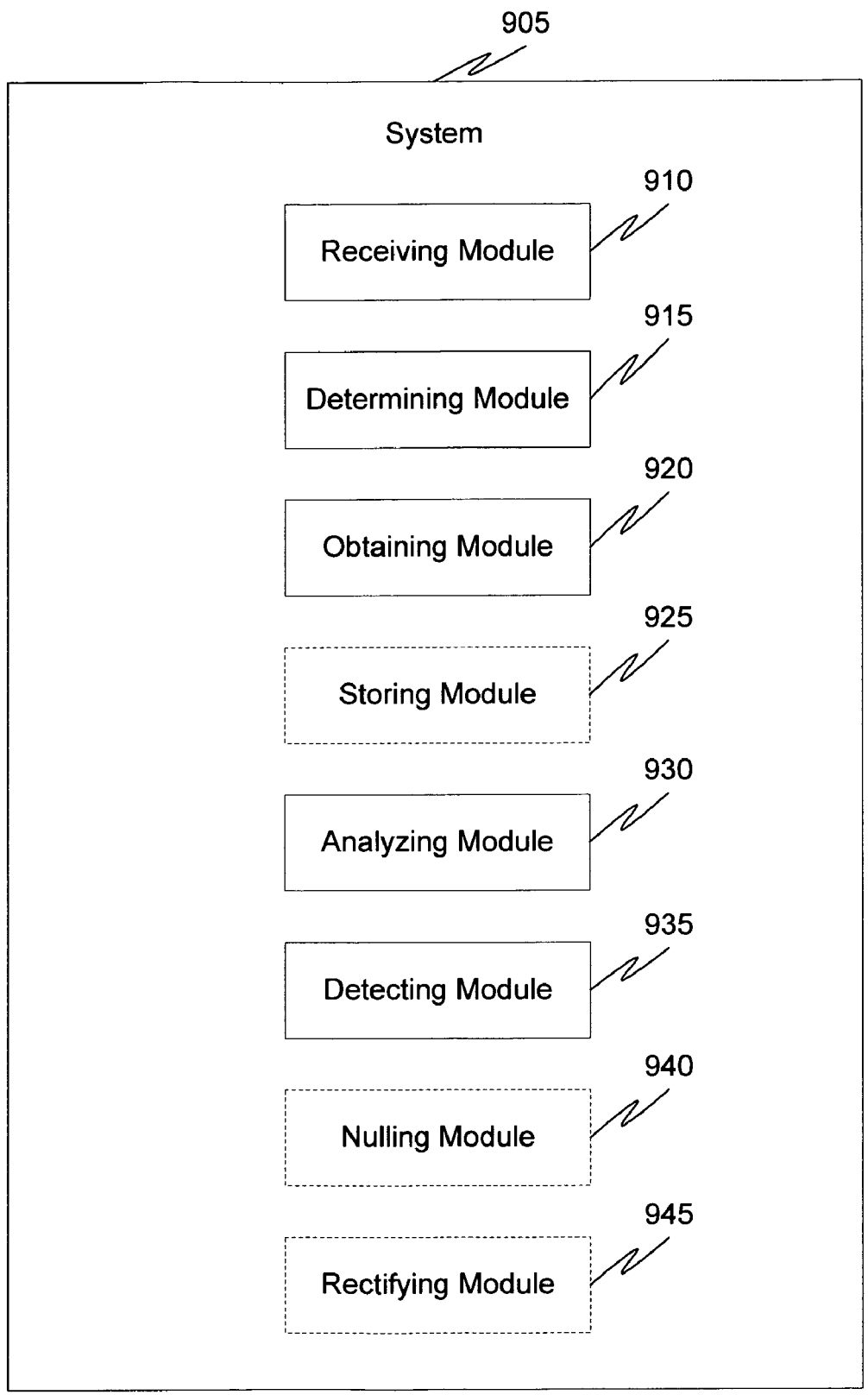
FIG. 9 is a block diagram of a system for performing channel estimation in a wireless communication system, in accordance with an embodiment.

FIG. 9 is a block diagram of a system 905 for performing channel estimation in a wireless communication system, in accordance with an embodiment. System 905 can be adapted to function in at least a first zone. For instance, in the 802.16e example, system 905 can be adapted to function at least in a unicast transmission mode. System 905 comprises a receiving module 910 to receive a signal frame from a base station, say base station 115-1, in wireless communication system 110. The signal frame can be received in the first zone. The first zone of the signal frame can comprise a preamble symbol and a data part.

A determining module 915 can be configured to determine a first delay profile corresponding to the preamble symbol. As mentioned in FIG. 7, the first delay profile of FIG. 9 is different from the two or more first delay profiles of FIG. 3, FIG. 4 and FIG. 8 above. Hence, for clarity purposes, the first delay profile of FIG. 9 is hereinafter referred to as third delay profile. Further, an obtaining module 920 can obtain a second delay profile corresponding to the data part of the first zone. Again, the second delay profile of FIG. 9 is different from the second delay profile of FIG. 3, FIG. 4 and FIG. 8 above. Hence, for clarity purposes, the second delay profile of FIG. 9 is hereinafter referred to as fourth delay profile. The third delay profile and the fourth delay profile can be a power delay profile or a tap delay profile. A storing module 925 can store one or more of the third delay profile and the fourth delay profile.

System 905 can further comprise an analyzing module 930 to analyze the fourth delay profile in conjunction with the third delay profile. A detecting module 935 can detect one or more aliased taps in the time domain channel response of the data part of the first zone based on the analysis of the fourth delay profile in conjunction with the third delay profile. The detection of the one or more aliased taps is described in detail in conjunction with FIG. 7. Upon detecting the one or more aliased taps, system 905 can either null or rectify the one or more aliased taps from the time domain channel response of the data part of the first zone. A nulling module 940 performs a nulling operation on the one or more aliased taps and a rectifying module 945 can perform a rectifying operation on the one or more aliased taps. The nulling and the rectifying operations are explained in detail in conjunction with FIG. 8.

It will be appreciated by those with ordinary skill in the art that a system, which is configured for performing all the functions of system 805 of FIG. 8 above and system 905 of FIG. 9, is within the scope of the invention.

The various embodiments described above provide methods and systems to perform computationally efficient channel estimation in a wireless communication system. In some embodiments, the tap locations may be corrected by taking into account the leakage and windowing effects resulting from frequency to time domain conversion of the channel response that can enhance channel estimation. The sparse nature of the wireless channels contributes to minimal overlapping of taps, due to which high performance gain is achieved while performing channel estimation. Further, an embodiment described above uses the first zone in conjunction with the second zone for performing channel estimation. Moreover, when a signal frame comprises only the first zone, a preamble symbol is used for performing channel estimation in the data part of the first zone. A channel estimate can be obtained by the usage of the preamble symbol, based on the assumption that the pilot spacing in the preamble symbol is smaller than the pilot spacing in the data part of the first zone or the second zone.

What is claimed is:

1. A method of channel estimation in a wireless communication system, the method comprising:
    receiving a plurality of signal frames from a plurality of base stations in the wireless communication system, each of the plurality of signal frames comprising at least a first zone and a second zone, wherein the first zone comprises a group of unicast symbols and a preamble, the second zone comprises a group of broadcast symbols, and wherein the plurality of base stations transmit a different signal on the first zone, and wherein at least two base stations of the plurality of base stations transmit a signal on the second zone that are exactly identical in nature;
    determining two or more first delay profiles corresponding to two or more base stations of the plurality of base stations, the two or more first delay profiles being determined using the first zone, each of the two or more first delay profiles being one of a power delay profile and a tap delay profile; and
    detecting at least one aliased tap in a time domain channel response of the second zone using the two or more first delay profiles.

2. The method of claim 1, wherein the two or more first delay profiles are determined using a preamble symbol corresponding to each of the two or more base stations, the preamble symbol being transmitted in the first zone.

3. The method of claim 1, wherein the detecting comprises:
    obtaining a second delay profile corresponding to the second zone, the second delay profile being one of a power delay profile and a tap delay profile; and
    correcting the time domain channel response of the second zone based on the two or more first delay profiles and the second delay profile.

4. The method of claim 3, wherein the correcting comprises:
    calculating an aggregate delay profile of the two or more first delay profiles;
    comparing the aggregate delay profile with the second delay profile; and
    identifying the at least one aliased tap in the time domain channel response of the second zone based on the comparing step.

5. The method of claim 4, wherein the aggregate delay profile is one of a:
    sum of the two or more first delay profiles, if each of the two or more first delay profiles is a power delay profile; and
    union of the two or more first delay profiles, if each of the two or more first delay profiles is a tap delay profile.

6. The method of claim 4 comprising performing one or more of:
    nulling the at least one aliased tap from the time domain channel response of the second zone; and
    rectifying the at least one aliased tap in the time domain channel response of the second zone based on a modulo offset technique.

7. The method of claim 3, wherein the correcting accounts for one or more of a leakage effect and a windowing effect resulting from a frequency domain to time domain conversion.

8. The method of claim 1, wherein the time domain channel response is obtained based on one or more of an Inverse Fast Fourier Transform (IFFT) and a tap location in the second zone.

9. A method of channel estimation in a wireless communication system, the method comprising:
    receiving a signal frame from a base station in the wireless communication system, the signal frame comprising at least a first zone and a second zone, the first zone comprising a unicast preamble symbol and a data part of the first zone; wherein the second zone comprises a group of broadcast symbols;
    determining a first delay profile corresponding to the signal frame, the first delay profile being determined using the preamble symbol, the first delay profile being one of a power delay profile and a tap delay profile;
    obtaining a second delay profile corresponding to the data part of the first zone, the second delay profile being one of a power delay profile and a tap delay profile;
    analyzing the second delay profile in conjunction with the first delay profile; and
    detecting at least one aliased tap in a time domain channel response of the data part of the first zone based on the analyzing step; and
    performing one or more of:
        nulling the at least one aliased tap from the time domain channel response of the data part of the first zone; and
        rectifying the at least one aliased tap in the time domain channel response of the data part of the first zone based on a modulo offset technique.

10. A system for channel estimation in a wireless communication system, the system comprising:
    a receiving module, the receiving module configured to receive a plurality of signal frames from a plurality of base stations in the wireless communication system, each of the plurality of signal frames comprising at least a first zone and a second zone, wherein the first zone comprises a group of unicast symbols and a preamble, the second zone comprises a group of broadcast symbols;
    a determining module, the determining module configured to determine two or more first delay profiles corresponding to two or more base stations of the plurality of base stations, the two or more first delay profiles being determined using the first zone, each of the two or more first delay profiles being one of a power delay profile and a tap delay profile; and a detecting module, the detecting module configured to detect at least one aliased tap in a time domain channel response of the second zone using the two or more first delay profiles.

11. The first system of claim 10, wherein the system comprises a storing module to store the two or more first delay profiles.

12. The system of claim 10, wherein the detecting module comprises:
   a calculating module to calculate an aggregate delay profile corresponding to the two or more first delay profiles;
   an obtaining module to obtain a second delay profile corresponding to the second zone, the second delay profile being one of a power delay profile and a tap delay profile; and
   a comparing module to compare the aggregate delay profile with the second delay profile.

13. The system of claim 10 further comprises one or more of:
   a nulling module to null the at least one aliased tap from the time domain channel response of the second zone; and
   a rectifying module to rectify the at least one aliased tap in the time domain channel response of the second zone based on a modulo offset technique.

14. The system of claim 10, wherein the system is hosted on a mobile station, the mobile station including one or more of a personal computer, a laptop, a mobile phone and a personal digital assistant.

15. The system of claim 14, wherein the two or more base stations belong to one or more of an active set of base stations and a candidate set of base stations corresponding to the mobile station.

16. A system for channel estimation in a wireless communication system, the system comprising:

a receiving module to receive a signal frame from a base station in the wireless communication system, the signal frame comprising at least a first zone and a second zone, the first zone comprising a unicast preamble symbol and a data part of the first zone; wherein the second zone comprises a group of broadcast symbols a determining module to determine a first delay profile corresponding to the signal frame, the first delay profile being determined using the preamble symbol, the first delay profile being one of a power delay profile and a tap delay profile;

an obtaining module to obtain a second delay profile corresponding to the data part of the first zone, the second delay profile being one of a power delay profile and a tap delay profile;

an analyzing module to analyze the second delay profile in conjunction with the first delay profile; and a detecting module to detect at least one aliased tap in the data part of the first zone, based on the analyzing module.

17. The system of claim 16 further comprises a storing module to store one or more of the first delay profile and the second delay profile.

18. The system of claim 16 further comprises one or more of:
   a nulling module to null the at least one aliased tap from the time domain channel response of the data part of the first zone; and
   a rectifying module to rectify the at least one aliased tap in the time domain channel response of the data part of the first zone based on a modulo offset technique.

* * * * *